Nov. 12, 1929.   J. C. BLAIR   1,735,595
SHEET GLASS FORMING APPARATUS
Filed May 15, 1926
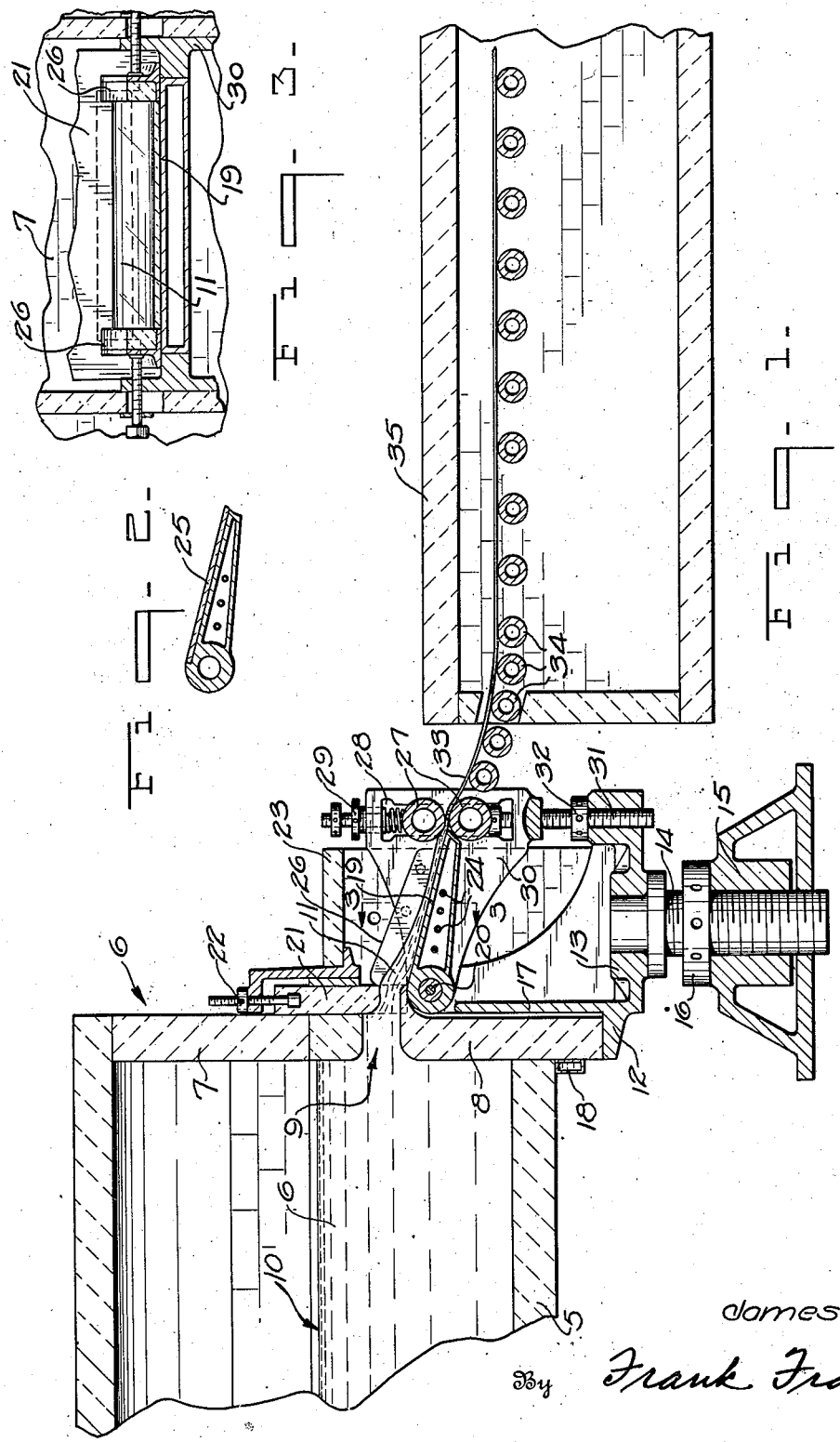
Inventor
James C. Blair.
By Frank Fraser
Attorney Patented Nov. 12, 1929

1,735,595

UNITED STATES PATENT OFFICE

JAMES C. BLAIR, OF TOLEDO, OHIO, ASSIGNOR TO LIBBEY-OWENS GLASS COMPANY, OF TOLEDO, OHIO, A CORPORATION OF OHIO

SHEET-GLASS-FORMING APPARATUS

Application filed May 15, 1926. Serial No. 109,444.

The present invention relates to sheet glass forming apparatus, and has particular reference to an apparatus adapted for the production of substantially flat glass.

An important object of the invention is to provide a process and apparatus for producing sheet glass wherein an adjustable slab is suitably associated with a glass supplying receptacle whereby a stream of glass may flow down said slab, preferably under the head pressure of the molten supply, the apparatus including rolls associated with the slab to reduce the stream to sheet form of predetermined dimensions.

Another object of the invention is to provide a glass receptacle having an orifice therein, and an adjustable slab associated with the orifice in a manner that a stream of glass, under the head pressure of the molten glass in said receptacle, will flow down said slab, and including means for adjusting the angularity of the slab to control the speed of flow down the same, and a pair of rolls associated with the end of the slab for reducing the stream of glass to sheet form.

Another object of the invention is to provide an apparatus for producing sheet glass, especially well adapted for use as plate glass blanks, wherein a stream of molten glass is flowed down an adjustable slab, the slab having associated therewith means for controlling the width of the stream, and a pair of rolls, one above the stream and one beneath the stream for reducing said stream to sheet thickness of predetermined thickness.

Other objects and advantages of the invention will become apparent during the course of the following description.

In the drawings wherein like numerals are employed to designate like parts throughout the same, Fig. 1 is a fragmentary vertical longitudinal section through my improved apparatus, Fig. 2 is a sectional detail of a modified form of slab, and Fig. 3 is a transverse section of said slab.

In the drawings the numeral 5 designates a receptacle containing a mass of molten glass 6 which may be continuously produced as is well known in the art.

The receptacle 5 has an end 6', comprising an upper portion 7 and a lower portion 8, forming an orifice 9 therebetween. The sections 7 and 8 are arranged preferably in spaced relation during normal operation, the orifice 9 formed between the said sections being preferably arranged beneath the normal level 10 of the molten glass 6, so that a stream 11 will issue from the receptacle under the head pressure of said molten glass.

The lower section 8, which is preferably the adjustable section, is supported on an extension 12, carried on a suitable frame 13. The frame 13 has depending therefrom a relatively heavy threaded shaft 14, operable through a base 15 by means of a collar 16. An upstanding plate 17 is provided to prevent accidental displacement of the lower section of the end wall 8. By operating the collar 16, the section 8 will be raised and lowered. A suitable cooler 18 is arranged as shown in Fig. 1 to freeze the glass leaking between the bottom of the receptacle and the end portion 8.

A slab or other suitable runway 19 is pivotally mounted in the frame 13 as at 20 in proximity to the orifice 9, and may be adjusted to control the angularity thereof, thus controlling the speed of the stream. The stream of molten glass 11 is adapted to flow upon the slab 19, and to control the rate of flow the position of the slab 19 may be controlled by means of the pivotal connection 20, and the adjustable shear cake 21 may be placed in the proper position to control the thickness of the stream. The shear cake 20 may be operated by means of the jack arrangement 22 or some other mechanical construction.

Arranged around the slab 19 is a hood 23 to protect the molten glass 11 on said slab from drafts, etc. Burners or other forms of heating elements may be contained in the hood to properly control the temperature of the glass flowing down the slab. The slab, if desired, may be internally heated by means of the heater 24, or a cooling medium may be circulated through the slab to rapidly reduce the temperature of the molten glass thereon. In other words, suitable means may be provided for controlling the temperature of the slab.

In Fig. 2 a modified form is shown wherein a graphite clay insert 25 is formed on the upper surface of said slab where the glass contacts. As shown in Fig. 3, suitable side boards 26 may be adjustably arranged on top of the slab to control the width of the flow of glass moving on the slab, thus controlling the width of sheet formed. Associated with the end of the slab 19 is a pair of sheet forming rolls 27, carried by means of a suitable frame 28, and adjustable by means of a jack arrangement 29. The rolls and jack arrangement are carried by means of a bracket 30 having a pivotal connection on the shaft 20, so that the rolls 27 and slab may be moved as an integral structure about the shaft 20. To raise the bracket 30 as a whole, the threaded shaft 31 is adjusted by means of the threaded collar 32. To control the clearance between the rolls 27, the upper jack arrangement 29 is adjusted. The rolls 27 are preferably internally cooled, and are adapted to be positively rotated so that a definite amount of glass will be passed therethrough at a predetermined speed. The sheet 33 is conveyed upon rolls or the like 34, through an annealing leer 35, to reduce it gradually to room temperature.

A sheet of glass formed by the above mentioned apparatus will be substantially flat and uniform in thickness making it satisfactory for plate glass uses, wherein the surfaces of said sheet are later ground and polished. With the present process a sheet may rapidly and continuously be formed. The speed of sheet formation is controlled by means of the shear cake, angularity of the slab, and the speed of rotation of the sheet forming rolls. The adjustable end 8 together with the slab 19 and rolls 27 can be raised and lowered as a unit upon rotation of the collar 16. The slab 19 and rolls 27 can be adjusted independently of the adjustable end 8 upon rotation of the threaded collar 32, and the clearance between the rolls 27 can be varied by adjustment of the upper jack arrangement 29.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, said receptacle having an adjustable end adapted to form an orifice beneath the glass level of the glass therein, whereby a stream of glass flows from the receptacle under head pressure, means for adjusting said adjustable end to vary the size of the orifice, and means for reducing the stream to sheet form.

2. In sheet glass apparatus, a receptacle containing a mass of molten glass, said receptacle having an adjustable end adapted to form an orifice beneath the level of the molten glass therein, whereby a stream of glass flows from the receptacle under head pressure, means for adjusting said adjustable end to vary the size of the orifice, a slab down which the glass flows, and means for reducing the stream of glass to sheet form.

3. In sheet glass apparatus, a receptacle containing a mass of molten glass, said receptacle having an adjustable end forming an orifice through which a stream of glass may flow under the head pressure of the glass in said receptacle, means for adjusting said adjustable end to vary the size of the orifice, an adjustable slab associated with the orifice and down which the stream of glass flows, and roll means for reducing the stream to sheet form.

4. In sheet glass apparatus, a receptacle containing a mass of molten glass, said receptacle having an adjustable end forming an orifice through which a stream of glass flows under the head pressure of the molten glass in said receptacle, means for adjusting said adjustable end to vary the size of the orifice, an adjustable slab associated with the orifice and down which the stream may flow, means for adjusting the angularity of the slab for controlling the speed of flow of glass down the slab, and a pair of superimposed rolls associated with the slab for reducing the stream to sheet form.

5. In sheet glass apparatus, a receptacle containing a mass of molten glass, said receptacle having an adjustable end forming an orifice through which a stream of glass flows under the head pressure of the molten glass in said receptacle, means for adjusting said adjustable end to vary the size of the orifice, an adjustable slab associated with the orifice and down which the stream may flow, means for adjusting the angularity of the slab for controlling the speed of flow of glass down the slab, a pair of rolls associated with the slab for reducing the stream to sheet form, and means for adjusting the clearance between said rolls.

6. In sheet glass apparatus, a receptacle containing a mass of molten glass and having an adjustable end forming an orifice through which a stream of molten glass flows, an adjustable runway in proximity to said orifice for receiving the stream of molten glass flowing therethrough, sheet forming means associated with said runway, and means for adjusting said adjustable end, runway, and sheet forming means as a unit.

7. In sheet glass apparatus, a receptacle containing a mass of molten glass and having an adjustable end forming an orifice through which a stream of molten glass flows, an adjustable runway in proximity to said orifice for receiving the stream of molten glass flowing therethrough, sheet forming rolls associated with said runway, means for adjusting said adjustable end, runway, and sheet forming rolls as a unit, and means for adjusting said runway and sheet forming rolls only.

8. In sheet glass apparatus, a receptacle containing a mass of molten glass and having an adjustable end forming an orifice through which a stream of molten glass flowing therethrough, a pair of sheet forming rolls associated with said runway, means for adjusting said adjustable end, runway, and sheet forming rolls as a unit, and means for varying the clearance between said rolls.

9. In sheet glass apparatus, a receptacle containing a mass of molten glass and having an adjustable end forming an orifice through which a stream of molten glass flows, an adjustable runway in proximity to said orifice for receiving the stream of molten glass flowing therethrough, a pair of sheet forming rolls associated with said runway, means for adjusting said runway and rolls as a unit, and means for varying the clearance between said rolls.

10. In sheet glass apparatus, a receptacle containing a mass of molten glass and having an adjustable end forming an orifice through which a stream of molten glass flows, an adjustable runway in proximity to said orifice for receiving the stream of molten glass flowing therethrough, sheet forming rolls associated with said runway, means for adjusting said adjustable end, runway, and sheet forming rolls as a unit, means for simultaneously adjusting the runway and sheet forming rolls only, and means for varying the clearance between said rolls.

Signed at Toledo, in the county of Lucas and State of Ohio, this 12th day of May, 1926.

JAMES C. BLAIR.